Patented July 31, 1951

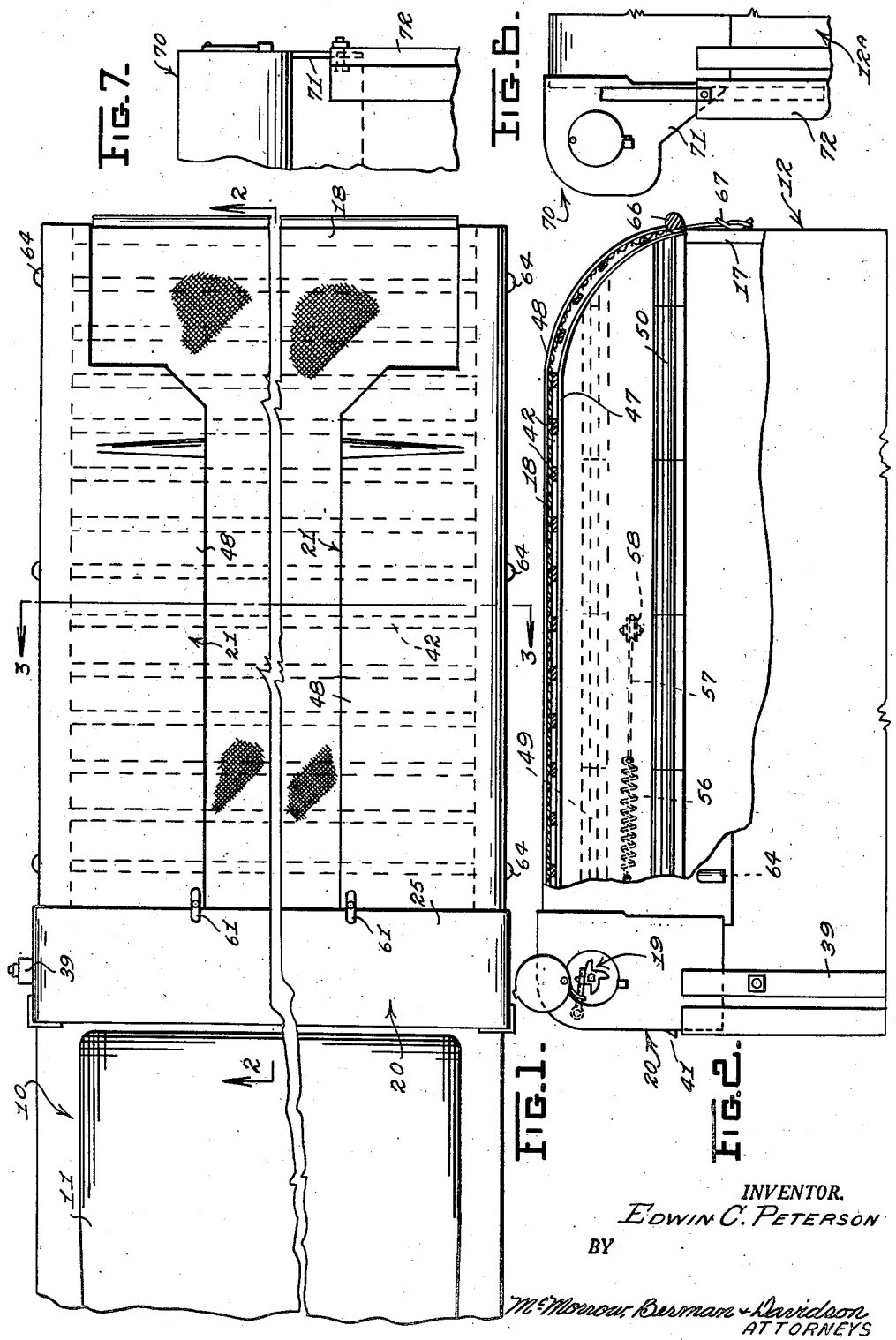

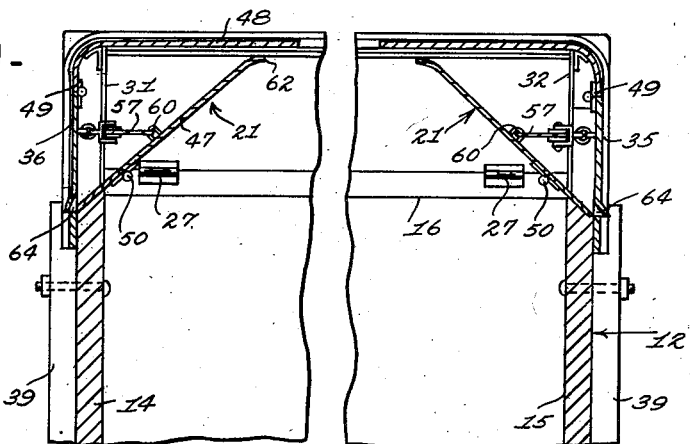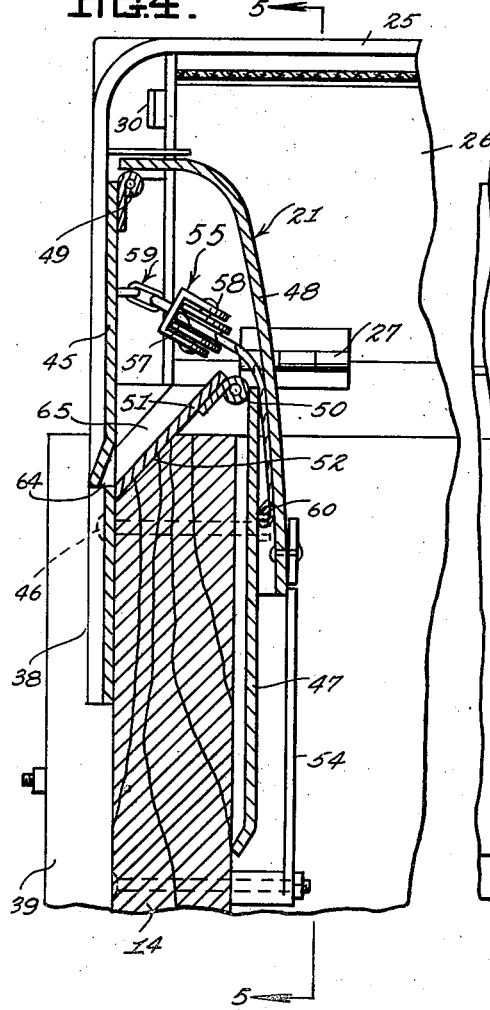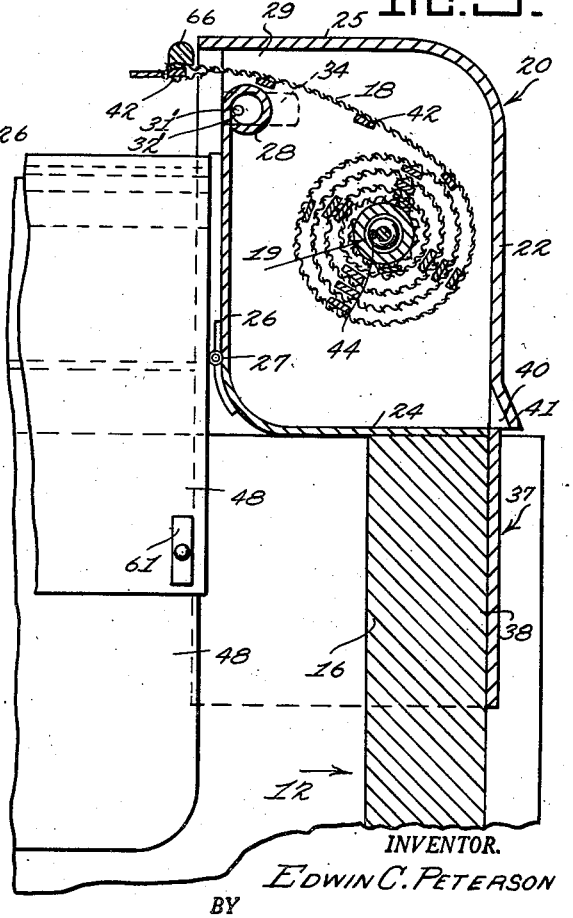

2,562,209

UNITED STATES PATENT OFFICE 2,562,209

CANVAS TRUCK COVER ROLL-UP TYPE

Edwin C. Peterson, Crookston, Minn.

Application March 3, 1949, Serial No. 79,453

7 Claims. (Cl. 296—98)

This invention relates to a canvas cover for trucks and more particularly to a retractable canvas cover having foldable guide members along the sides of the open body whereby the guide members may be folded out of the way as an obstruction to the expeditious loading or unloading of the body.

It is an object of this invention to provide a canvas cover for open bodies of trucks and the like which may efficiently and quickly be applied over the open top by one man despite wind conditions and other phenomena which generally cause such difficulty in the application of canvas covers that the services of several men are required.

Another object of this invention is to provide a canvas cover of the kind to be more particularly described hereinafter having a pair of foldable guide channel forming members on the opposite side edges of the truck body for holding and guiding the canvas cover as it is being extended or retracted from a housing on one end of the body.

Still another object of this invention is to provide a canvas cover for open truck bodies as used for transporting grain and like material for securely covering the grain to prevent it from being blown from the body while it is being moved about in the course of its transportation. The channel members along the sides of the body are so constructed and arranged to form guide members on the sides of the canvas for carrying off any moisture which is collected on the canvas and thereby keeping the grain in the truck in a desired dry condition.

With the above and other objects in view, my invention consists in the arrangement, combination and details of construction disclosed in the drawings and specification and then more particularly pointed out in the appended claims.

In the drawings:

Figure 1 is a top plan view, partly broken away, of an open truck body having a canvas cover device, constructed according to an embodiment of my invention.

Figure 2 is a fragmentary side elevation, partly broken away and partly in section, taken substantially on the line 2—2 of Figure 1.

Figure 3 is a fragmentary, transverse section, partly broken away taken on the line 3—3 of Figure 1.

Figure 4 is a fragmentary transverse section through the guide channel forming members showing the channel forming members in their retracted or folded position.

Figure 5 is a fragmentary, detail longitudinal section taken substantially on the line 5—5 of Figure 4.

Figure 6 is an end elevation, partly broken away, of a modified form of this invention.

Figure 7 is a rear end elevation, partly broken away of the modified form shown in Figure 6.

Referring to the drawings, the numeral 10 designates generally a truck having a front cab 11 and a rear body 12. The body 12 is of the type generally used for conveying grain or other material which may be readily cast into the body through the open top thereof. The body may be of the general side panel type having a pair of side walls 14 and 15, a front wall 16 and a rear wall 17. The rear wall 17 may be fixed or may be hinged at the bottom or top to provide for the removal or insertion of material within the confines of the side and front walls.

In the use of panel or stake trucks of this general type, considerable difficulty is experienced in containing the grain or other light material within the body 12 when a high wind condition exists, due to natural causes or in the conveyance of the material from one point to another wherein a high wind condition is caused to exist over the top of the body. This high wind condition will normally cause the loose material between the side walls to be thrown or lost through the open top of the body. In order to overcome this loss of material it is conventional to apply a canvas or other fabric cover over the open top of the body after the material has substantially filled the body. In such high wind conditions it is frequently very difficult for one or two men to apply the canvas cover over the top of the body as the canvas cover itself is subject to the high wind conditions and requires a considerable effort for applying the canvas cover to the body. In order to overcome this difficulty and to provide for the suitable covering of the loose material when contained within the body, I have provided a fabric or flexible cover 18 which may be quickly and efficiently applied over the open top of the truck by one man in a very short length of time.

According to an embodiment of my invention, the canvas cover 18 is contained on a spring-pressed roller 19, carried in a housing 20, so that the cover 18 may be fully enclosed within the housing 20 or may be extended from the housing and from the roller 19 for overlying the top, open surface of the body 12. In order to prevent the wind from getting under the side edges of the canvas 18, I have provided guide channels 21, extending along the opposite side walls of the body 12 for guiding the side edges of the canvas while it is being extended from the body 20 or retracted back into it. The guide channels 21 provide for the suitable support of the side edges of the canvas while providing also for the free sliding movement of the main body of the canvas along the length of the body 12. In order to suitably support the side edges of the canvas 18, the guide channels 21 must extend slightly inwardly beyond the inner surfaces of the side walls 14 and 15 of the body 12, and as this inward extension of the guide channels 21 provides an obstruction for inserting material into the body 12 or removing it therefrom, the formation of the guide channels 21, constructed according to an embodiment of this invention, is such that the channels may be collapsed and slightly overlie the inside walls of the side walls 14 and 15.

The housing 20 within which the roller 19 is rotatably supported is elongated and adapted to be supported on the upper edge of the front wall 16 of the body 12. The body 20 or housing is formed of a solid rear wall 22, a bottom wall 24 and a top wall 25. The housing 20 is open on the rear side thereof, and the rear open side is adapted to be closed by a door or closure member 26. The closure member 26 is hinged at the bottom edge thereof by a hinge 27 and is adapted to substantially close the rear open side of the housing. The top edge of the door or closure member 26 is rolled or inturned, as noted by the numeral 28 in the drawings to provide an elongated bead which extends transversely of the body 12, along the length of the housing 20. The upper edge of the bead 28 is spaced downwardly from the lower surface of the top wall 25 and the space between the upper edge of the door 26 and the top wall 25 defines a passage 29 through which the flexible cover 18 is adapted to be extended. The closure 26 is supported on the housing 20 for vertical swinging movement by the horizontal hinge 27 and may be swung to an open position which is extended rearwardly from the housing 20. The closure or door 26 is latched in its closed position, in the forward open side of the housing 20 by a pair of latch members 30 which are carried by a pair of transversely spaced apart intermediate walls 31 and 32. The latch members 30 include an inwardly extending pin 31' which is adapted to engage through a correlated opening 32' in a rearwardly extending tab 34, carried by the upper edge of the closure 26.

The rear wall 22 and the side walls 35 and 36 of the housing 20 extend downwardly below the bottom wall 24 to form a skirt 37 for attaching the body 20 to the front wall 16 of the body 12. The skirt 37 is adapted to be engaged in a recess 38, formed between the outer panels of the body 12 and the supporting posts 39 generally formed or disposed outwardly of the side panels or walls of the body 12. The recess 38 is formed in the forward surface of the front wall 16 and in the side surfaces of the side walls 14 and 15 so that the skirt may be frictionally engaged between the side walls and the supporting post 39. In this manner the housing 20 is removably supported on the forward end of the body 12 and may readily be attached to or removed therefrom. The rear wall 22, of the housing 20 is formed with an opening 40 in alignment with the bottom wall 24 so that any moisture or water which may collect within the housing 20 may be readily drained from the housing outwardly of the body 12, so that the water or other moisture will not be disposed within the body 12 for deteriorating or otherwise adversely affecting the material presently within the body or the material to be subsequently inserted therein. The opening 40 is formed by striking a detent 41 outwardly from the rear wall 22, at the juncture of the bottom wall 24 therewith so that the outwardly extending detent 41 provides a guard over the opening 40 so that no other moisture or material will be blown into the housing 20.

With the housing 20 fastened on the front wall 16, of the body 12, the cover 18 may be drawn from the housing 20 rearwardly over the open top. In order to suitably stiffen the flexible body 18 against sagging within the body 12, suitable transverse bracing members 42 are secured to the lower side of the fabric 18, the bracing members 42 being spaced apart along the length of the fabric and being adapted to be disposed between the convolutions of the coiled fabric wound about the spring roller 19. The spring roller 19 is of a conventional form and so disposed within the housing 20 that upon withdrawal of the canvas cover 18 through the aperture 29, the spring 44 will be tensioned so that when the free end of the canvas 18 is let loose, the spring 44 will rewind the cover 18 within the housing 20.

In order to provide for the suitable sliding support of the side edges of the cover 18, when it is extended along the length of the body 12, I have provided a pair of collapsible or foldable guide channel members 21 along the opposite side walls. Each of the guide channel members 21 is formed in substantially the same manner, so that the description of one of the channel members 21 will be suitably applicable to the other.

The channel member 21 is formed of a fixed supporting member or plate 45 which is suitably secured, by bolts 46, or other suitable fastening means to the outside surface of the side walls 14 and 15. The supporting member 45 extends above the upper edge of the side walls and provides a suitable support for a pair of hingedly mounted channel forming members or plates 47 and 48. One of the channel forming plates 48, as the uppermost plate, noted in Figure 4 of the drawings, is formed with a contour which will substantially conform to the contour of the top wall of the housing 20. The outer edge of the upper channel forming plate 48 is hingedly mounted to the extreme upper end of the supporting plate or panel 45 by a hinge 49. The lower channel forming member or plate 47 is provided with a hinge 50 at its upper and outer edge, the hinge 50 also engaging an upwardly and inwardly extending bracing bar or plate 51, which is in turn fixed to or carried by the inner side of the supporting member or plate 45. The upwardly and inwardly supporting member 51 is adapted to abut and overlie the upwardly and inwardly inclined top edge 52 of the side walls 14 and 15. The hinge 50 is disposed substantially in vertical alignment with the inner side of the side walls 14 and 15, so that in the downwardly swung position of the lower channel forming member 47, the channel forming member 47 will substantially flatly overlie the inside surface of the wall 14. In the folded or collapsed position of the channel 21, the upper channel forming member 48 will substantially overlie the upper portion of the lower channel forming member 47, in the manner clearly shown in Figure 4 of the drawings.

For securing the channel 21 in its folded or retracted position, a latch pin or arm 54 may be swingably mounted on the inside surface of the side walls 14 and 15 and adapted to engage the lower edge of the upper channel forming member 48, so that the latching member 54 will suitably restrain the channel forming members 47 and 48 against free swinging movement within the body 12. Aside from the latch 54, spring means is provided for normally pressing the lower channel forming plate 47 into its extreme extended position.

The spring means 55 is formed of an elongated coil spring 56 which is fixed at one end to the upwardly extending supporting member 45, and at the other end to a flexible member 57. The free end of the flexible member 57 is trained about a pulley 58 and then fixedly secured to the inside surface of the lower channel forming plate 47. The pulley 58 is suitably supported between the hinges 49 and 50 on the fixed supporting member 45 by a suitable fastening means, noted by the numeral 59 in the drawings. In the extended position of the plate 47, one edge of the plate 47, adjacent the hinge 50, will abut the inner edge of the upwardly and inwardly inclined supporting member 51 for limiting the upward swinging movement of the plate 47, as biased by the spring 56 to substantial alignment with the upwardly and inwardly inclined supporting member 51. As the connection 60 of the flexible member 57 to the plate 47 is moved inwardly of the hinge point 50, the tension of the spring 56 will be exerted on the plate 47 for pressing the plate to its upwardly extending position for guiding therein the flexible cover 18.

A latching member 61 is pivotally mounted on the upper channel forming member 48, at the extreme forward end thereof and is adapted to overlie the rear edge of the top wall 25, of the housing 20. The latch member 61, engaging over the rear edge of the housing 20, will hold the upper channel forming member 48 in its raised or operative position. The raised position of the channels 21 is clearly shown in Figure 3 of the drawings, wherein the main portion of the upper plate 48 is disposed in a substantially horizontal position, the lower surface of the plate 48 being spaced slightly upwardly above the extreme upper end of the lower channel forming plate 21. The space 62 between the extreme upper end of the lower channel forming member 47 and the inner edge of the upper channel forming member 48 provides a suitable space within which the cover 18, including the transverse supporting strips 42 may be slidably engaged, for sliding movement along the length of the body 12. The extreme rear edges of the top and side walls of the housing 20 are adapted to slightly overlie the extreme forward edge of the channel forming members 47 and 48 for limiting the extension of the channel 21 and for properly positioning the channel forming members 47 and 48 so that the space 62, between the inner edges of the channel forming members will be disposed in substantial horizontal alignment with the opening 29 in the housing 20, whereby the cover 18 may be freely extended through the opening 29 and along the length of the channels 21.

The supporting members 45 are formed with openings 64 spaced apart along the length thereof, at the lower edge of the upwardly and inwardly extending supporting member 51. The member 51, being downwardly and outwardly inclined, relative to the side walls 14 and 15, defines a substantial channel 65 for conducting water draining down from the side edges of the cover 18, outwardly from the body 12. The drain openings 64, are provided in substantially the same manner and for the same purpose as the drain openings 40, described for the housing 20.

In the use and operation of the truck cover unit, constructed according to an embodiment of my invention, the side supporting members 45 are initially engaged on the opposite side walls of the main body 12. The housing 20 may then be engaged on the front wall thereof so that the rear edges of the housing 20 overlap the extreme forward edges of the supporting member 45 and the channel forming members 47 and 48. While the truck body 12 is being loaded, the cover 18 will be initially telescoped or rolled within the housing 20 and will be restrained against extreme movement within the housing 20 by a transverse stop member 66, which is fixed to or otherwise suitably carried by the extreme rear end of the canvas 18. The stop member 56 is of a sufficient size so that it, together with the endmost reinforcing strip 42, will not pass through the passage 29 in the rear wall of the housing. The channel forming members 47 and 48 will be disposed in their collapsed or folded position, while the body 12 is being loaded. In the folded condition of the channels 21, the channels do not form an obstruction for loading or unloading of the truck body and their disposition on the side walls is such that they may be readily moved to a channel-forming, operative position. When the body 12 is suitably filled, the upper channel forming member 48 is initially moved to its fully raised position, and the latch member 61 is engaged over the top surface of the top wall of the housing 20. This latch 61 will suitably support the upper channel forming plate 48 in its raised or operative position. The tension of the spring 56 will cause the lower channel forming member 47 to be fully raised to its upwardly and inwardly extending position. With the channel forming members in their operative position, the cover 18 may be drawn from the housing 20 and the side edges of the cover will be engaged in the openings 62 of the confronting channels 21. In this position the cover 18 may be drawn along the entire length of the body 12, for suitably closing the upper open side thereof. The rear end of the cover 18 may then be engaged about a suitable fastening member 67, carried by the rear wall 17, on the outer surface thereof. The rear end of the channels 21 may be downwardly bowed, as clearly shown in Figure 2, to provide for the smooth sliding movement of the cover 18 over the rear end of the lower channel member 47, for engaging the extreme rear end of the cover 18 to the fastening element 67. Any moisture, as rain, collecting on the top surface of the cover 18 will be drained from the cover down through the side gutters 65 and through the passage 40 of the housing 20. In this manner the inside of the body 12 may be maintained dry at all times, and it is not necessary that the body 12 must be filled with grain or other material to require the use of the cover 18 in its extended position.

In Figures 1 to 5, inclusive, there is shown a form of this invention wherein the housing 20 will overlie the front edge of the open space within the body 12. In Figures 6 and 7, there is shown a modified form of this invention, wherein a housing 70, operable in the same manner as the housing 20, for containing a cover therein, is disposed forwardly of the forward wall of the housing 12, so that the entire area of the body 12 may be used for storing the grain or other material. The housing 70 is formed at its upper end in substantially the same manner as the housing 20, described above, and a depending, triangular fastening element 71 is fixed to or formed on the side walls of the housing 70 and is adapted to be engaged in a correlated channel member 72, or other suitable bracket for securing the depending arm 21, forwardly of the forward wall of the body 12a.

I do not mean to confine myself to the exact details of construction herein disclosed, but claim all variations falling within the purview of the appended claims.

I claim:

1. A cover unit for a truck having an open body comprising a transverse housing engageable across an end of said body, a spring roller in said housing, a flexible cover engaging about said roller and extensible from said housing, an upwardly extending channel supporting member on the opposite side walls of said body extending along the length thereof, a pair of inwardly extending channel forming plates hingedly mounted on each of said supporting members longitudinally thereof for slidably receiving said cover and being foldable for overlying the inner side of the side walls of said body in their folded position.

2. A cover unit for a truck having an open body comprising a spring roller on one end of said body, a flexible cover engageable about said roller and extensible along the length of said body, a pair of guide channel forming plates hingedly mounted on the opposite side walls of said body, said plates being swingable from a folded position with one plate overlying the other and both overlying said side walls, to an inwardly extending, channel forming position for receiving the side edges of said cover extended from said roller.

3. A cover unit for a truck having an open body comprising a spring roller on one end of said body, a flexible cover engageable about said roller and extensible along the length of said body, a vertical supporting member on each of the side walls of said body extending along the length thereof, a lower channel forming plate hinged on each of said supporting members swingable from a depending, retracted position, to an upwardly and inwardly extending channel forming position, an upper channel forming plate hinged on each of said supporting members, swingable from a retracted, depending position, overlying said lower plate to an inwardly extending channel forming position spaced above said lower plate, said cover being slidable between said channel forming plates along the length of said body.

4. A cover unit for a truck having an open body comprising a spring roller on one end of said body, a flexible cover engageable about said roller and extensible along the length of said body, a vertical supporting member of each of the side walls of said body extending along the length thereof, a lower channel forming plate hinged on each of said supporting members swingable from a depending, retracted position, to an upwardly and inwardly extending channel forming position, an upper channel forming plate hinged on each of said supporting members, swingable from a retracted, depending position, overlying said lower plate to an inwardly extending channel forming position spaced above said lower plate, said cover being slidable between said channel forming plates along the length of said body, said vertical supporting members formed with drain openings adjacent said lower channel forming plate.

5. A cover unit for a truck having an open body comprising a spring roller on the front end of said body, transversely thereof, a flexible cover engageable about said roller and extensible along the length of said body, a housing about said roller open on the rear side thereof, a vertically swinging closure member hinged on the lower rear edge of said housing and extending thereacross, a guide bead on the upper edge of said closure member spaced downwardly from the top wall of said housing, said cover being engageable over said guide bead, a pair of guide channel forming plates hingedly mounted on the opposite side walls of said body, said plates being swingable from a folded position with one plate overlying the other and both overlying said side walls, to an inwardly extending, channel forming position for receiving the side edges of said cover extended from said roller.

6. A cover unit for a truck having an open body comprising a spring roller on the front end of said body transversely thereof, a flexible cover engageable about said roller and extensible along the length of said body, a housing about said roller open on the rear side thereof, a vertically swinging closure member hinged on the rear lower edge of said housing and extending thereacross, a guide bead on the upper edge of said closure member spaced downwardly from the top wall of said housing, said cover being engageable over said guide bead, a pair of guide channel forming plates hingedly mounted on the opposite side walls of said body, said plates being swingable from a folded position with one plate overlying the other and both overlying said side walls, to an inwardly extending, channel forming position for receiving the side edges of said cover extended from said roller, and latch means engaging said channel plates and said housing for securing said plates in extended channel forming position.

7. A cover unit for an open body comprising lower channel forming plates hinged on the opposite sides of the open body swingable from a depending retracted position to an upwardly and inwardly extending channel forming extended position, upper channel forming plates hinged above each of said lower plates swingable from a depending retracted position to an inwardly extended channel forming extending position spaced above said lower plates, and a flexible cover member slidably in the confronting channels formed by said plates in the extended position thereof.

EDWIN C. PETERSON.

REFERENCES CITED

The following references are of record in the file of this patent:

UNITED STATES PATENTS

| Number | Name | Date |
|---|---|---|
| 1,255,809 | Senson | Feb. 5, 1918 |
| 1,656,077 | Schlicher | Jan. 10, 1928 |
| 2,230,908 | Redman | Feb. 4, 1941 |

FOREIGN PATENTS

| Number | Country | Date |
|---|---|---|
| 278,862 | Great Britain | Oct. 20, 1927 |